United States Patent [19]

Iijima

[11] 4,368,076
[45] Jan. 11, 1983

[54] INK COMPOSITION

[75] Inventor: Zenshiro Iijima, Soka, Japan

[73] Assignee: Adger Kogyo Co., Ltd., Saitama, Japan

[21] Appl. No.: 252,975

[22] PCT Filed: Jan. 6, 1979

[86] PCT No.: PCT/JP79/00004
§ 371 Date: Sep. 6, 1980
§ 102(e) Date: Sep. 5, 1980

[87] PCT Pub. No.: WO80/01387
PCT Pub. Date: Jul. 10, 1980

[51] Int. Cl.$^3$ .............................................. C09D 11/00
[52] U.S. Cl. ......................................... 106/22; 106/26
[58] Field of Search ..................................... 106/26, 22

[56] References Cited
U.S. PATENT DOCUMENTS
4,014,833  3/1977  Story ........................ 260/29.2 EPA FOREIGN PATENT DOCUMENTS
49-765826  3/1974  Japan .

Primary Examiner—John Kight, III
Assistant Examiner—Amelia B. Yarbrough
Attorney, Agent, or Firm—Birch, Stewart, Kolasch and Birch

[57] ABSTRACT

An ink composition which comprises a solution of cobalt thiocyanate or a mixture of a compound capable of producing a thiocyanate ion and a compound capable of producing a cobalt ion in a liquid vehicle, the solution having been incorporated with polyalkylene glycol. This ink composition can give vivid inking images of deep blue color, which images can be erased, if necessary, by wiping with cloth, paper, fibrous material or the like impregnated with water.

13 Claims, No Drawings

INK COMPOSITION

TECHNICAL FIELD

The present invention relates to an ink composition which affords ink images of a brilliant tint which are erasable with water. More particularly, the present invention relates to an ink composition which contains as predominant ingredients thiocyanate ion, a metal ion capable of showing a specific tint with the thiocyanate ion, and polyalkylene glycol and which produces ink images of a brilliant tint on a material to be transferred, such as paper. The ink images are easily erasable, if necessary, with water.

BACKGROUND ART

The thiocyanate ion shows a specific color in the presence of a certain kind of metal, for example, a metal of the iron group. When a slightly yellow aqueous solution of ferric nitrate or a light carmine aqueous solution of cobalt chloride is added to a colorless aqueous solution of potassium thiocyanate, for example, an orange brown or red purple aqueous solution attended with no precipitate is formed, respectively. Because of these characteristic color reactions, the thiocyanate ion and these coloring metal ions have been utilized for simple qualitative analyses of the individual ions. From the past, aqueous colored colloidal dispersions and aqueous solutions of certain kinds of organic dyes were used as ink compositions. Whereas, an ink composition containing thiocyanate ion has not yet been known heretofore.

The present inventor previously provided an ink composition containing cobalt thiocyanate as a predominant ingredient (Japanese Patent Publn. No. 49-27527; Japanese Pat. No. 765,826). This ink composition has a character that letters and lines drawn with the ink composition can easily be erased, if necessary, by wiping with cloth, paper or fibers impregnated with water.

In this ink composition, however, there is such a disadvantage in actual use that if the amount of cobalt thiocyanate used is saved and a solution of a lower concentration is used as ink, the written letters are not colored in blue immediately but are colored for the first time when the solvent is evaporated to increase the concentration. To overcome such disadvantage, the use of an ink wherein the concentration is increased to at least 30% is necessary. In such case, however, fluidity of the ink becomes poor because of such high concentration so that difficulty arises in charging a pen core with the ink. When the concentration of cobalt thiocyanate becomes higher by gradual evaporation of the solvent on the repeated use of a pen, the ink will not come out clearly so that the written letters become thin. Considering these situations, inks containing cobalt thiocyanate as a predominant ingredient is used usually in a concentration of about 20%. In this case, however, difficulties arise in actual use as described above because of such too low concentration.

DISCLOSURE OF INVENTION

As a result of extensive researches made to overcome drawbacks in the above mentioned conventional "easily erasable" ink compositions, it has now been found that the tint formed between thiocyanate ion and cobalt ion can be intensified remarkably by adding polyalkylene glycol to a solution containing in a liquid vehicle cobalt thiocyanate alone or both of thiocyanate ion and cobalt ion and that a deep blue ink composition can be obtained even in case either or both of thiocyanate ion and cobalt ion is low in concentration. The present invention has been accomplished on the basis of the above finding.

In accordance with the present invention, there is provided an ink composition which comprises a solution of cobalt thiocyanate or a mixture of a compound capable of producing thiocyanate ion and a compound capable of producing cobalt ion in a liquid vehicle such as water and/or an organic solvent, the solution having been incorporated with polyalkylene glycol as a color-intensifying assistant.

Cobalt thiocyanate is easily soluble in water and in a number of the organic solvents and its aqueous solution gives red violet color probably due to the formation of a cobalt complex in which 5 molecules of water are coordinated. Such color is also formed in a mixed aqueous solution of a compound capable of producing thiocyanate ion such as potassium thiocyanate and a compound capable of producing cobalt ion such as cobalt nitrate. However, addition of polyalkylene glycol to such aqueous solution gives a deep blue tint even in case of a concentration as low as 20% which is suitable for ink compositions. The inking images of letters and patterns drawn with this ink composition are clear and are erasable, if necessary, by wiping them with cloth, paper or a textile material impregnated with water.

Most of the water-soluble metal salts of thiocyanic acid are colorless, but a solution of nickel thiocyanate gives blue green color and is near to the blue tint of an ink composition containing cobalt thiocyanate alone. However, nickel thiocyanate alone is weak in tint and fails to give a desired ink composition. On the other hand, an aqueous solution of a water-soluble cobalt salt such as cobalt chloride or cobalt nitrate is light carmine to light red violet and is weak in tint even in a high concentration so that it cannot be used singly for an ink composition. A mixed solution of nickel thiocyanate and such water-soluble cobalt salt usually has red brown tint regardless of its concentration and letters written with the solution are thin and unclear so that these salts cannot be used as predominant ingredients for ink. It is unexpected however that when polyalkylene glycol such as polyethylene glycol is added to the mixed solution, a clear blue tint is produced in the solution so that the mixed solution gives an ink composition having the same tint as in the case of using cobalt thiocyanate alone. Thus, it is preferable to use nickel thiocyanate as a compound capable of producing thiocyanate ion and a water-soluble cobalt salt such as cobalt chloride as a compound capable of producing cobalt ion. In case other colored water-soluble metal salts of thiocyanic acid, such as ferric thiocyanate or palladium thiocyanate is used as a compound capable of producing thiocyanate ion, the blue tint inherent to cobalt thiocyanate will be changed. Consequently, the other metal salts are not used unless an ink composition having such changed tint is demanded. Moreover, ferric thiocyanate is not preferable as its tint tends to change with the lapse of time. In the present invention, it is preferable to use as a coloring ingredient cobalt thiocyanate alone or a combination of nickel thiocyanate as a compount capable of producing thiocyanate ion and cobalt chloride as a compound capable of producing cobalt ion.

Illustrative of the polyalkylene glycol used in the present invention as color-intensifying assistant are polyethylene glycol, polypropylene glycol and copolymers thereof. No particular limitation exists in the molecular weight of these compounds so far as they are water-soluble, but the molecular weight is generally within the range of 100–1000, preferably 200–300. It is particularly preferable to use polyethylene glycol having a molecular weight within the range of 200–300.

In the present invention, the polyalkylene glycol is effective not only to intensify the tint of a solution of cobalt thiocyanate in a low concentration but also to make the viscosity of an ink composition moderate so that smoothness is imparted on writing and "blot" on paper or the like is prevented. Further, evaporation of a liquid vehicle, for example, water is prevented and dropping of the ink from a pen core is also prevented.

The ink composition of the present invention is prepared by adding together or in any order of succession cobalt thiocyanate or a combination of a compound capable of producing thiocyanate ion and a compound capable of producing cobalt ion and polyalkylene glycol to a liquid vehicle such as water or a proper organic solvent, for example, methanol, ethanol, acetone, chloroform, ethyl acetate or a mixture thereof. The use of water or a mixture of water and the above mentioned organic solvent is preferable as the liquid vehicle.

On preparation of the ink composition, cobalt thiocyanate is added in a concentration within the range of not more than 30%, usually 5–20%. When a compound capable of producing thiocyanate ion and a compound capable of producing cobalt ion are used, the amounts of these compounds are so adjusted that cobalt thiocyanate formed from these compounds is maintained in its concentration within the above range. In a preferable example wherein nickel thiocyanate is used as a compound capable of producing thiocyanate ion and cobalt chloride is used as a compound capable of producing cobalt ion, it is desirable to use the nickel thiocyanate in an amount of 0.5–15% by weight, usually 1–10% by weight and the cobalt chloride in an amount of 1–15% by weight, usually 1–10% by weight in the liquid vehicle. In this case, the proportion of the cobalt chloride to the nickel thiocyanate is such that 0.1–3 parts by weight, usually 0.5–2.5 parts by weight of cobalt chloride are used per part by weight of nickel thiocyanate. The amount of the polyalkylene glycol added depends on the concentration of the coloring ingredient, for example, cobalt thiocyanate, so that if the concentration of cobalt thiocyanate is low, a larger amount of polyalkylene glycol is required but, on the other hand, if the concentration is high, a smaller amount of polyalkylene glycol is sufficient enough. In general, the concentration of polyalkylene glycol is 1–30% by weight, usually 5–20% by weight in the liquid vehicle. Further, polyalkylene glycol is applied in an amount of 0.2–2.5 parts by weight, preferably 0.5–2 parts by weight per part by weight of cobalt thiocyanate. In a preferable example wherein nickel thiocyanate is used as a compound capable of producing thiocyanate ion, the ratio of polyalkylene glycol to nickel thiocyanate is such that 0.5–7 parts by weight, usually 1–5 parts by weight of polyalkylene glycol are used per part by weight of nickel thiocyanate.

As a metal salt of thiocyanic acid, for example, cobalt thiocyanate or nickel thiocyanate, a commercially available product can be utilized. However, such salt may be prepared from thiocyanic acid and cobalt or nickel carbonate or hydroxide and used as such without isolation.

In the ink composition of the present invention, appropriate auxiliary additives, for example, a printing ink and a thickening agent such as starch, carboxymethylcellulose or gelatin for use in mimeographic purpose may be added besides the above mentioned ingredients, according to the intended use.

BEST MODE OF CARRYING OUT THE INVENTION

The present invention will now be illustrated in more detail by way of examples. It is to be construed, however, that the present invention is not limited to the specific embodiments illustrated herein.

EXAMPLE 1

In 100 g of water were dissolved 15 g of cobalt thiocyanate. The solution of this concentration showed light red violet color but did not show the desired blue color. Next, 10 g of polyethylene glycol (molecular weight: 200) were added to this solution whereby the solution turned blue.

When this blue solution was used as an ink for a signpen and letters and patterns were drawn on paper or cloth with the ink, inking images of blue color were obtained. No change was observed in the inking images even when they were allowed to stand as such. The inking images were not erased even by rubbing them with a dry cloth. Next, the surface of the inking images was wiped with paper or cloth impregnated with a small amount of water to erase them whereby the inking images were immediately erased.

EXAMPLE 2

10 Grams of cobalt thiocyanate were dissolved in 100 g of water to form a solution of light red purple color. When 18 g of polyethylene glycol were added to this solution, it was turned blue. This solution was used as a writing ink to write letters in the same manner as described in Example 1 and the surface of the inking images was wiped with cloth impregnated with a small amount of water whereby they were immediately erased.

EXAMPLE 3

5 Grams of nickel thiocyanate and 10 g of cobalt chloride were added to 100 g of water and dissolved therein. The solution in this state showed red brown color. Next, 10 g of polyethylene glycol (molecular weight: 200) were added to this solution whereby it turned blue immediately. A pen core made of polyester and acrylic resin was impregnated with this solution and used to write letters on paper and cloth. The letters written showed vivid blue color. No change was observed in the inking images even by allowing them to stand as such. Next, the inking images were wiped with cloth impregnated with a small amount of water to erase them whereby the letters were soon erased.

EXAMPLE 4

In 100 g of water were dissolved 3 g of nickel thiocyanate and 5 g of cobalt chloride. The solution in this state showed red brown color. Although a pen core made of polyester and acrylic resin was impregnated with this solution and used to write letters on paper, the written letters showed only faint color so that the solution had no function as an ink. Next 15 g of polyethylene glycol (molecular weight: 200) were added to this solution whereby it turned blue immediately. A pen core made of polyester and acrylic resin was impregnated with this solution and used to write letters on paper and cloth. The written letters showed blue on the paper and cloth. No change was observed in the inking images when they were allowed to stand as such. Next, the inking images were wiped with cloth impregnated with a small amount of water to erase them, whereby the inking images were immediately erased.

INDUSTRIAL APPLICABILITY

The ink composition of the present invention using as a coloring ingredient cobalt thiocyanate originally used or formed in the ink composition has such a character that inking images written with the ink composition showed vivid blue color when the concentration of the coloring ingredient is high, but is erased to almost colorless when diluted with water. Accordingly, letters and patterns written with this ink can be erased by wiping the surface of the inking images with cloth impregnated with water. As the ink composition of the present invention has been incorporated with polyalkylene glycol as color-intensifier, the above mentioned drawbacks in the conventional arts are overcome and the quantity of cobalt thiocyanate can significantly be decreased so that the expensive cobalt thiocyanate can be saved. Besides these merits, evaporation of the solvent can be prevented and preservability of the ink when charged into a sign-pen is enhanced. Further, a pen runs smoothly on writing with the ink and neither "blot" nor "dropping" of the ink takes place.

The ink composition of the present invention can therefore be used directly as a writing ink and processed into fountain pen-type merchandise by charging sign-pens with the ink composition and can also be used as a printing ink by incorporation with a proper auxiliary additive.

I claim:
1. An ink composition comprising:
   a liquid vehicle including water;
   a source of cobalt ion and thiocyanate ion; and
   a polyalkylene glycol having a molecular weight of 100–1000.
2. The ink composition according to claim 1, wherein said polyalkylene glycol is selected from the group consisting of polyethylene glycol, polypropylene glycol and copolymers thereof.
3. The ink composition according to claim 1, wherein the liquid vehicle further includes a material selected from the group consisting of methanol, ethanol, acetone, chloroform, ethyl acetate or a mixture thereof.
4. The ink composition according to claim 1, further comprising a thickening agent selected from the group consisting of starch, carboxymethylcellulose and gelatin.
5. The ink composition according to claim 1, wherein said cobalt ion- and thiocyanate ion-source includes cobalt thiocyanate, the concentration of the cobalt thiocyanate in said liquid vehicle being not greater than 30 percent by weight.
6. The ink composition according to claim 1, wherein said cobalt ion- and thiocyanate ion-source includes a mixture of a compound capable of producing cobalt ion and a compound capable of producing thiocyanate ion, the concentration of said mixture in said liquid vehicle being such that the concentration of cobalt thiocyanate formed in situ is not greater than 30 percent by weight in said liquid vehicle.
7. The ink composition according to claim 6, wherein said compound capable of producing cobalt ion is cobalt chloride and said compound capable of producing thiocyanate ion is nickel thiocyanate.
8. The ink composition according to claim 5, wherein said polyalkylene glycol is used in an amount of 0.2–2.5 parts by weight per part by weight of said cobalt thiocyanate.
9. The ink composition according to claim 7, wherein the concentrations of said nickel thiocyanate and said cobalt chloride in said liquid vehicle are 0.5–15 percent by weight and 1–15 percent by weight, respectively, and wherein said cobalt chloride is used in an amount of 0.1–3 parts by weight per part by weight of said nickel thiocyanate.
10. The ink composition according to claim 7, wherein said polyalkylene glycol is used in an amount of 0.5–7 parts by weight per part by weight of said nickel thiocyanate.
11. The ink composition according to claim 1, 8 or 10, wherein the concentration of said polyalkylene glycol in said liquid vehicle is 1–30 percent by weight.
12. The ink composition according to claim 2, wherein said polyalkylene glycol has a molecular weight of 200–300.
13. An ink composition having moderate viscosity consisting essentially of
   a source of cobalt ion and a source of thiocyanate ion having a concentration of less than 30 percent,
   a liquid vehicle including water, and
   a polyalkylene glycol as a color intensifier, said polyalkylene glycol having a molecular weight of about 100 to 1000.

* * * * *